April 30, 1963  R. W. BOGLE ETAL  3,088,112
ECHO ALTIMETER FOR A LOW LEVEL GUIDANCE SYSTEM
Filed June 26, 1957  3 Sheets-Sheet 1

INVENTORS
ROBERT W. BOGLE
WILLIAM S. KNOWLES
BY
ATTORNEYS

INVENTORS
ROBERT W. BOGLE
WILLIAM S. KNOWLES
BY
ATTORNEYS

3,088,112
ECHO ALTIMETER FOR A LOW LEVEL GUIDANCE SYSTEM
Robert W. Bogle, Silver Spring, Md., and William S. Knowles, Malibu, Calif., assignors to the United States of America as represented by the Secretary of the Navy
Filed June 26, 1957, Ser. No. 668,269
5 Claims. (Cl. 343—13)

This invention relates to an echo altimeter or a distance measuring system and more particularly to an electronic altimeter for vertical guidance control of a missile at very low elevations which utilizes super-regenerative action for detection and amplification of the echo signal to produce output voltages proportional to altitude over ranges from about 50 to 3,000 feet.

The conventional pulse radar systems include a transmitter which produces short bursts or pulses of radio frequency signal, which after radiation from a suitable antenna may be reflected by a target of some kind. A fraction of the original R.-F. signal is returned to a receiver by way of the same or possibly another antenna after an elapsed time which by the nature of the constant velocity of electromagnetic propagation is exactly proportional to the distance from the radar to the target.

The best known pulse radar systems utilize separate transmitter and receiver sections, the latter usually consisting of a superheterodyne circuit wherein most of the amplification takes place in R.-F. and video stages, whose intelligence bandwidth and inversely gain is determined by the degree of range resolution required. Total gain bandwidth and also the match of the receiver local oscillator and transmitter frequencies are typical problems involved in this type of radar.

Another previous system relating to object locating and/or distance determing radio systems, and particularly to radio altimeters, utilizes a superregenerative oscillator for transmitting pulses of radio energy and receiving these pulses after reflection from the earth or other reflecting surface. A periodically varying voltage such as a sawtooth voltage, is applied to the oscillator for cyclically varying its blocking rate. Upon reception of reflected pulses, however, the oscillator is locked in momentarily by said pulses when the period of the varying blocking rate gets close to the period required for the transmitted pulses to travel to the reflecting surface and back to the oscillator. The resulting momentary pause in the change in the oscillator pulsing rate due to said lock in, is utilized to indicate the pulse reception. This is accomplished by applying the oscillator pulses to a frequency counter and utilizing the counter output to deflect the cathode ray of an indicator tube in one direction and by simultaneously deflecting the cathode ray in another direction along a distance scale. The indication produced on the cathode ray trace by said momentary lock-in gives the distance to the pulse reflecting object or surface.

This prior system utilizing a superregenerative oscillator, however, does not operate on the same principle as the present invention, since it does not utilize a second modulating pulse applied to the oscillator for the purpose of establishing a condition of superregenerative sensitivity to the echo pulse. Furthermore, the prior system noted supra does not derive a basic high range resolution.

The present invention for an Echo Altimeter or Low Level Guidance System is a more sophisticated and complex system utilizing the basic principles of the Super-regenerative Pulse Radar System disclosed in the co-pending application of Robert W. Bogle, Serial No. 668,270. Filed June 26, 1957.

Briefly stated, the present invention consists essentially of a single R.-F. oscillator which is pulse modulated with a two pulse signal repeated at a nominal rate, where the time interval between pulses corresponds to the radar delay. The oscillator responds to each of these modulating pulses in the same manner, but with different effect. The useful function of the first R.-F. pulse is to provide a short burst of energy corresponding to the usual radar transmitter pulse. The useful function of the second pulse is to provide the usual oscillator turn-on that is required in superregenerative detection. The sensitive period is that which immediately precedes the rise of this second pulse. In operation, the presence of an R.-F. signal due to the echo from the first pulse, will cause a change in the duration and/or height of the second or detector pulse, whose amplitude will be interpreted by succeeding interrator circuits as of a magnitude of 1 to 10 volts when the R.-F. signal is of a magnitude of tens of microvolts.

Two distant advantages are derived from the use of superregeneration. First, the usual enormous gain of such a system is utilized. Secondly, advantage has been taken of a method of amplification in which the amplification of tenth-microsecond pulses is removed from a typical video amplifier with its attendant gain bandwidth problems.

Therefore the pulse resolution is a matter only of the bandwidth of the R.-F. system, and by the simple expedient of increased radio frequency, the pulse and range resolution may be extended correspondingly.

In one preferred embodiment of the present invention, as disclosed herein, an R.-F. oscillator is modulated at a five kilocycle repetition rate with a double pulse. The time separation of the two pulses corresponds to the radar transit time and may vary from 0.15 to 6.0 microseconds, which corresponds to ranges of 75 to 3,000 feet. For an inter-pulse time appropriate for a given target range, the reflected return from the first R.-F. pulse will arrive at the oscillator in coincidence with the second R.-F. pulse. This coincidence will become manifest by an increased second pulse amplitude in the oscillator tank circuit, and is detected by crystal or diode detectors whose video characteristics are adequate to preserve the pulse resolution.

This video output of the R.-F. system, indicative of "ranging" or range coincidence, is of the order of one volt. Little wideband amplification is required in subsequent stages. The modulation pulses are generated by two thyratron-delay line generators and these thyratrons are triggered by a sawtooth pulse from a range function generator. Since this pulse rises linearly with time, a difference in bias on the thyratrons will cause them to fire at slightly different times. The time separation, and therefore the range, will be directly proportional to the differential bias. Range or altitude is therefore established and indicated by a D.-C. voltage derived from the detection and discrimination stages.

Since a single R.-F. oscillator serves as both transmitter and receiver, both first and second pulses appear in the video output. A gate function is required to eliminate the first or transmitter video pulse, since no change in its amplitude will occur on ranging. This is accomplished by a simple diode switch circuit controlled by the transmitter pulse thyratron.

The absolute amplitude of the R.-F. detector output pulses may be expected to vary somewhat from unit to unit and with variations in supply voltage or tube life. To compensate for the effect of this variability, the present system is designed to operate as a comparator. This is accomplished by causing the modulator to omit the transmitter pulse on alternate repetition cycles and to switch synchronously the video output between two channels which are subsequently rectified and bucked. Changes in the "B" or detector pulse amplitude due to effects other than ranging are therefore balanced out.

The amplitude of the detector pulse on these cycles when no transmitter pulse is transmitted cannot vary due to ranging, and therefore serves as a reference for changes due to supply voltage et cetera.

The output of the comparator and discriminator is a D.-C. voltage which takes some negative value for range coincidence or "range," and will be zero otherwise. This discriminator output controls a phantastron range sweep circuit whose function is to provide range sweeping or search in the absence of a ranging signal and to act as a simple amplifier when a ranging signal or target has been acquired. The normal action of a phantastron is such as to eliminate automatically the sweep action on application of a negative D.-C. signal to the grid.

The action of the servo loop tends to reduce the range when a ranging signal is acquired. Range reduces until a balancing reduction of range signal is attained. By this means, the present system follows the minimum range and avoids spurious altitude indication due to reflections from objects not directly below. Flight tests with a very simple antenna have shown that roll anges of ±80 degrees cause no change in indicated altitude.

One object of the present invention is to provide an electronic altimeter for vertical guidance control of missiles at very low elevations.

Another object of the present invention is to provide an echo altimeter which utilizes the superregenerative action, or detection and amplification of the echo signal to provide enormous gain and wide bandwidth.

A further object of the present invention is to provide an electronic echo altimeter which produces output voltages proportional to altitude over ranges from about 50 feet to 3,000 feet.

Other objects and many of the attendant advantages of this invention will be readily appreciated as the same becomes better understood by reference to the following detailed description when considered in connection with the accompanying drawings wherein.

Figure 1:
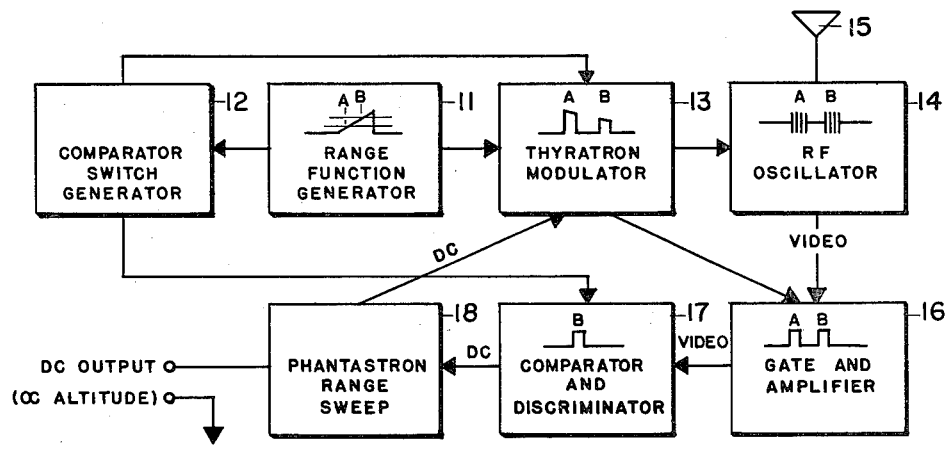
FIG. 1 is a block diagram illustrating one preferred embodiment of the present invention.
Figure 2:
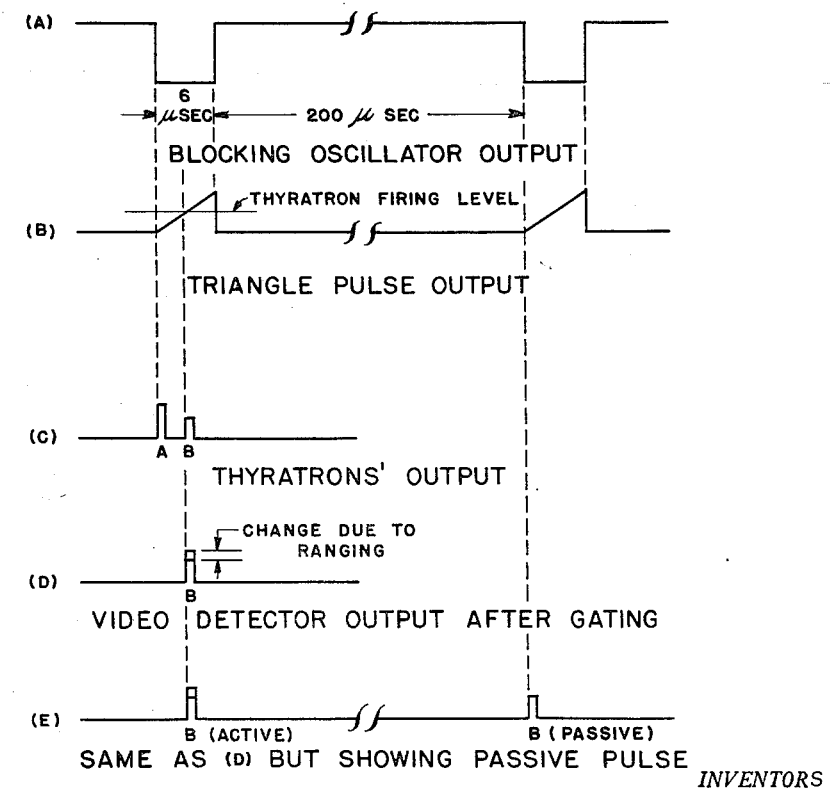
FIG. 2 is a series of pulse diagrams illustrating the idealized wave forms and their time relation in different portions of the circuits in the block diagram of FIG. 1.

Referring now to the drawings in detail, and more particularly to the block diagram of FIG. 1 and the idealized wave forms in the pulse diagrams of FIG. 2, the range function generator 11 generates a sawtooth pulse, as illustrated in FIG. 2B, which rises linearly with time and is applied to the comparator switch generator 12 as well as the thyratron modulator 13.

In the thyratron modulator 13, two thyratron delay line generators each receive the sawtooth pulse from the range function generator and since this pulse rises linearly with time, a difference in bias on the thyratrons will cause them to fire at slightly different times. The time separation, and therefore the range, will be directly proportional to the differential bias.

An R.-F. oscillator 14 is operably associated with a suitable transmitting and receiving antenna element 15 and receives the modulation pulses "A" and "B," as illustrated in FIG. 2C, from the thyratron modulator 13. The R.-F. oscillator 14 is modulated at a 5 kilocycle repetition rate with the double pulse as shown. The time separation of the two pulses corresponds to the radar transit time, and they vary from 0.15 to 6.0 microseconds which corresponds to 75 to 3,000 feet of altitude. For an interpulse time appropriate for a given target range or altitude, the reflected return from the first R.-F. pulse "A" will arrive at the oscillator in coincidence with the second R.-F. pulse "B." This coincidence will become manifest by an increased second pulse amplitude in the oscillator tank circuit, and is detected by crystal or diode detectors whose video characteristics are adequate to preserve the pulse resolution. This video output of the R.-F. system, indicative of ranging or range coincidence, may be of the order of 1 volt. Little wide band amplification is required in subsequent stages.

Since a single R.-F. oscillator 14 serves as both transmitter and receiver, both first and second pulses "A" and "B" in the pulse diagram in FIG. 1 would appear in the video output. The gate and amplifier 16 is therefore provided. The gate function is required to eliminate the first or "A" video pulse since no change in its amplitude will occur on ranging. This is accomplished by a simple diode switch circuit controlled by the "A" pulse thyratron.

The absolute amplitude of the R.-F. detector output pulses may be expected to vary somewhat from unit to unit and with variations in supply voltage or tube life. To compensate for the effect of this variability, the present system is designed to operate as a comparator. This is accomplished by utilizing the comparator and discriminator circuit 17 which receives the video signals from the gate and amplifier 16 and also a switching signal from the comparator switch generator 12. The comparator switch generator 12 also sends a switching signal to the thyratron modulator 13 which causes the modulator to omit the "A" or transmitter pulse on alternate repetition cycles and causes the comparator and discriminator 17 to switch synchronously the video output between two channels which are subsequently rectified and bucked. Changes in the "B" or detector pulse amplitude due to effects other than ranging are therefore balanced out.

The amplitude of the "B" pulse on these cycles where no "A" pulse is transmitted cannot vary due to ranging and therefore serves as a reference for changes due to supply voltage, etc.

The output of the comparator and discriminator 17 is a D.-C. voltage which takes some negative value for range coincidence or ranging and will be zero otherwise. This discriminator output controls a phantastron range sweep 18 whose function is to provide range sweeping or search in the absence of a ranging signal and to act as a simple amplifier when a ranging signal or target has been acquired. The normal action of a phantastron circuit is such as to eliminate automatically the sweep action on application of a negative D.-C. signal to the grid of the tube. The range sweep from the phantastron 18 is applied to the thyratron modulator 13.

The action of this servo loop tends to reduce the range when a ranging signal is acquired. Range reduces until a balancing reduction of range signal is attained. By this means the present system follows the minimum range and avoids spurious altitude indications due to reflections from objects not directly below. Flight tests with a very simple antenna have shown that roll angles of plus or minus 80° cause no change in indicated altitude. The phantastron range sweep circuit 18 acts as a simple amplifier when a ranging signal or target has been acquired and provides a D.-C. output which is proportional to the altitude.

The details of operation of the circuits illustrated in FIG. 1 in block diagram form will be described in detail in conjunction with the schematic circuit diagram of FIG. 3.

*Range Function Generator*

Figure 3:
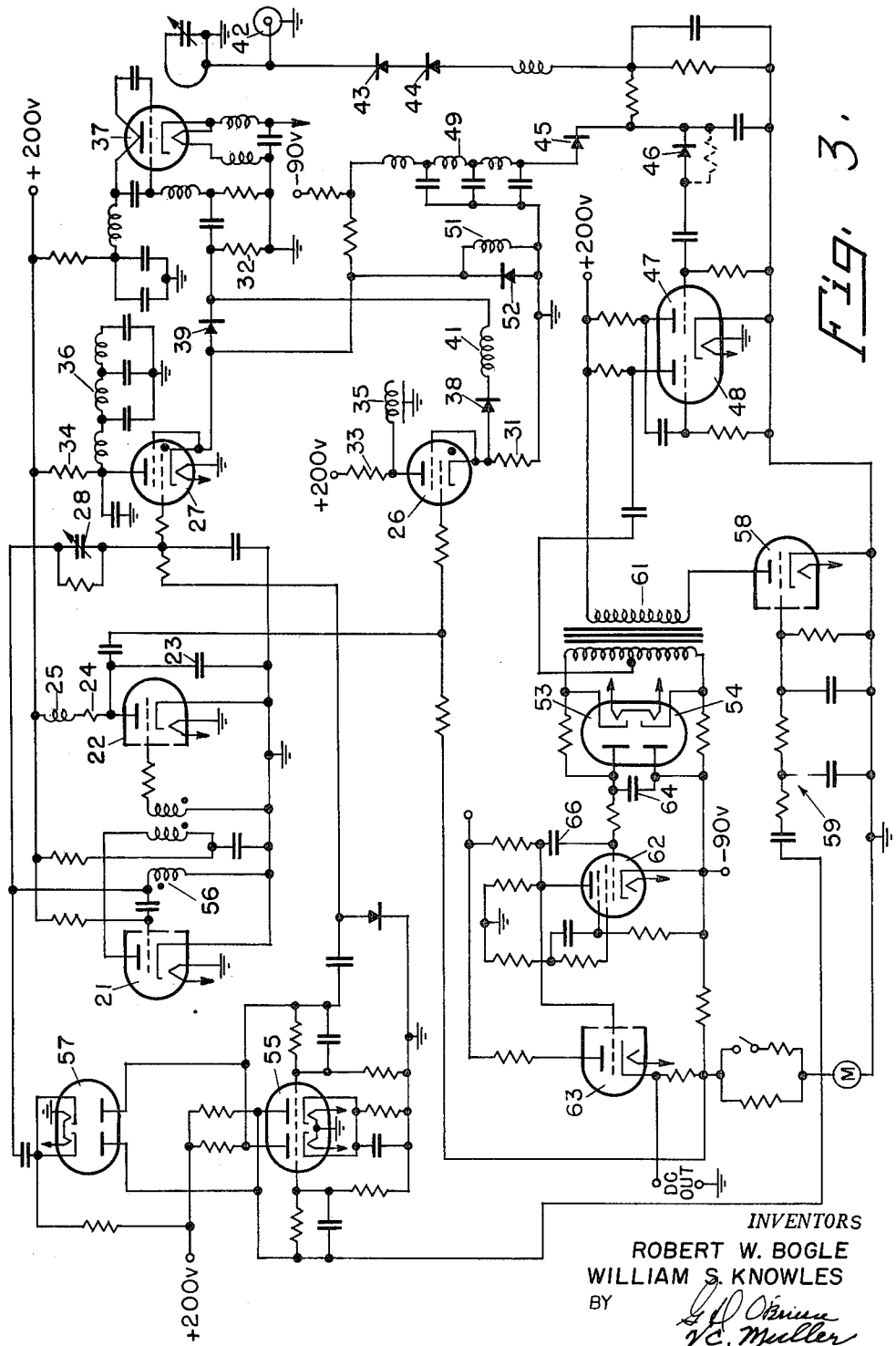
FIG. 3 is a circuit diagram illustrating one preferred embodiment in detail of the block diagram shown in FIG. 1.

The range function generator 11 of the present invention as illustrated in detail in FIG. 3 consists of a blocking oscillator, a triangle generator, and two pulse-forming thyratrons. Its purpose is to provide modulation pulses to activate the R.-F. oscillator 14.

The output consists of a pair of extremely short pulses of 0.1-microsecond duration width or less, at amplitudes of approximately fifty volts, as illustrated in FIG. 2C.

The interval between pulses determines the range, and must be variable from zero to six microseconds for a system whose maximum working range is 3000 feet. A repetition frequency of approximately five kilocycles has been used. The variable interpulse interval is controlled in the following manner.

Referring to the circuit diagram in FIG. 3, tube 21 is used as an astable blocking oscillator which generates a six-microsecond pulse at approximately a five-kilocycle repetition rate, as illustrated in FIG. 2A. This pulse is coupled to the grid of tube 22 driving it below cut-off during the pulse. Tube 22 forms a triangular wave, as shown in FIG. 2B, by allowing the plate by-pass condenser 23 to charge through the plate-charging resistor 24. In series with the plate-charging resistor 24 is shown a large inductor 25 which may be included if greater linearity of the triangle slope is desired.

This circuit was designed to give a triangle slope of five volts per microsecond, or approximately one volt per hundred feet of range.

By varying the D.-C. level of the triangular waveform as presented to the grid of tube 26, the ionization time of tube 26 relative to that of tube 27 can be controlled. If, for example, the D.-C. level of the triangular time base is only slightly negative, tube 26 will ionize near the start of the triangle. If the D.-C. level is made more negative, tube 26 will ionize at a correspondingly later time along the triangle.

Ionization time of tube 27 is governed by the abrupt voltage rise of the leading edge of the blocking oscillator pulse. It is not triggered from the triangle pulse since its ionization creates a grid circuit shunt which would change the slope of the triangle with resulting perturbation of the linearity of the system. The condition at the time of firing of the two thyratrons 26 and 27 is shown in FIG. 2C.

A trimmer condenser 28 is included as part of a capacitor divider in the grid circuit of tube 27 which provides a small variation in the ionization time of tube 27 with reference to the triangular time base. This variation is caused by the fact that a finite delay occurs between application of a positive signal to the thyratron grid and actual ionization, the amount of delay being a function of the rise characteristic of the triggering pulse.

The modulation pulses are generated by delay-line, thyratron circuits of a familiar design, in which positive pulses are developed across the cathode resistors 31 and 32 of a value equal to the characteristic impedance of the delay line.

Either distributed or lumped lines may be used. In the case of distributed lines, 400-ohm Millen line has been found satisfactory. Lumped lines tend to produce greater pulse amplitudes because of decreased losses. Three sections are adequate to provide suitable pulse shape. Rise times of ten to twenty millimicroseconds may be considered average.

After producing the modulator pulses, the thyratrons 26 and 27 must deionize to allow the plate resistors 33 and 34 to recharge the delay lines 35 and 36 in preparation for the next pulse. The plate-charging resistance is determined by two factors. First, its value should be small enough to allow essentially complete charging of the delay line during the interval between pulses; and secondly, it must be larger than a certain critical value below which continuous ionization of the thyratron occurs. This critical value is a function of the current through the plate-charging resistor and of the capacity present in the delay line. It also varies with tube type and with grid bias. In general, no major problems are present at pulse repetition frequencies up to at least five kilocycles.

Attention is directed to the time constant of the coupling between the plate of tube 22, the triangle generator, and the grid of tube 26, the variable range thyratron modulator. Since the thyratron grid draws current when ionized, a change in average D.-C. grid voltage occurs from that which is desired. Over the range of D.-C. level control produced by the control loop, this thyratron grid current reverses polarity. For this reason, a short time constant has been used to permit the grid current charge to leak off between each triangle interval. It should be noted that the average D.-C. level is not of importance in this instance, but rather the instantaneous level at the time of triangle occurrence.

Since the outputs of the two thyratron modulators 26 and 27 are connected to supply the R.-F. oscillator tube 37, precautions must be taken to prevent interaction. When the two thyratrons 26 and 27 are caused to fire within a few tenths of microseconds, the pulse from the first tube 26 tends to affect the bias of the second tube 27, causing the thyratrons to "lock in," i.e., fire simultaneously. To prevent this, germanium diodes 38 and 39 are placed in the output circuits of the thyratrons in such a manner that interaction is eliminated.

*Oscillator*

Single "acorn" triodes have been used for the R.-F. oscillator 37, operating in the thousand-megacycle region. Positive polarity modulator pulses are applied to the grid so that oscillator tube conduction occurs only during the pulses. A long time-constant grid circuit produces an average bias of −30 or −40 volts through grid-leak action.

The pulse produced by thyratron tube 27 activates the R.-F. oscillator to provide the transmitting signal, while the pulse from thyratron tube 26 sensitizes the oscillator to an echo signal. When the R.-F. oscillator 37 is pulsed, its oscillations start at extremely small amplitude (specifically, at noise level) and increase until maximum output is reached. If there is present in the oscillator tank circuit a small R.-F. voltage reflected from a target when the pulse from thyratron tube 26 occurs, fewer R.-F. cycles of oscillation are required to reach a given amplitude. The modulation pulse width from tube 26 is shorter than the time required to reach full R.-F. amplitude. Thus an echo signal increases amplitude of the detected R.-F. envelope.

In order to be influenced by weak echo signals, the oscillator tank circuit R.-F. voltage must decay by approximately 120 db before the sensitizing pulse from tube 26 occurs. In the present circuit, tank circuit Q cannot be reduced sufficiently to permit the damped wave train to decay quickly enough to meet the minimum range desired.

It has been found that maximum detection sensitivity may be obtained when the pulse from tube 26 has a relatively slow rise, and when the amplitude of the pulse is sufficiently small, so that the oscillator tube does not immediately draw grid current. This has been accomplished by insertion of a small choke 41 in series with the output of thyratron tube 26, and by use of additional loading of the output pulse at the cathode of tube 26.

The R.-F. oscillator 37 is coupled into a coaxial cable 42, which connects to the antenna. Approximately two watts peak output power may be obtained. This amounts to approximately ten volts across a 52-ohm cable.

Detection of the R.-F. envelope has been accomplished by silicon crystal diodes 43 and 44, such as the type 1N23B. By tapping these crystals across the antenna pickup loop at a suitable impedance level, pulse outputs of three or four volts may be obtained. Since the duration of the transmitted pulse is less than one-tenth microsecond, the total energy input to the crystal even at this voltage is not sufficient to cause burn-out. Silicon crystals exhibit a saturation effect; when an output of three to four volts is reached, increase in oscillator power does not increase the detected signal voltage. However, by placing two crystals in series, the output pulse amplitude has been increased to five or six volts.

*Gating*

Since the intelligence required to control the system is contained in the detector pulses and not in the transmitter pulses, it is necessary to eliminate the transmitter pulse from the control circuit. Both pulses, of course, are detected by the silicon crystals 43 and 44.

Gating is accomplished by a unidirectional crystal switch which uses two germanium diodes 45 and 46. The R.-F. detector consisting of diodes 43 and 44 produces negative polarity pulses and is opposed by a larger amplitude positive pulse during the transmitting interval. The net voltage at the junction of the two germanium diodes is positive, so that no signal appears at the grid of audio amplifier tube 47. When the receiving pulse R.-F. signal is detected, no opposing current exists, and the audio amplifier grid is driven negative. The effect of gating is shown in FIG. 2D.

A short delay line 49 is used between the output of the transmitting modulator pulse thyratron 27 and the crystal switch diodes 45 and 46 to compensate for delays in starting and stopping of the R.-F. oscillator 37. Further, a D.-C. bias has been included in the delay line portion of the crystal switch circuit to prevent unnecessary loading of the detected echo pulse. If the plate of crystal 45 were not biased negatively, the echo pulse would flow through crystal 45 as well as through crystal 46.

These considerations have dictated the inclusion of two components not previously mentioned. They are a 100-microhenry choke 51 and a germanium diode 52 in the cathode of thyratron 27. The choke 51 provides a D.-C. return for the thyratron cathode, preventing it from assuming the bias level of the crystal switch. The crystal diode 52 damps any negative oscillatory voltage which is present across the cathode choke 51.

The crystal switch also functions as a pulse stretcher. The receiver pulses developed across the R.-F. detector crystals 43 and 44 are only a few hundredths of a microsecond in duration. After these pulses pass through diode 46, the plate of this diode discharges slowly to stretch the pulse. The back resistance of the germanium diode 46 and stray circuit capacity are sufficient to form a suitable time constant, which is not critical. By means of the stretching, the pulses, whose high resolution is unnecessary after gating, are made more suitable for amplification in relatively narrow band amplifier stages.

Amplifier

Two triode amplifier stages 47 and 48 have been used to amplify the detector pulses. Before amplification, the pulses recovered from the crystal switch have a total amplitude of about two volts. The first amplifier tube 47 operates in a linear manner, producing a positive polarity pulse at its plate, having an amplitude of about fifty volts or more. It must be noted that the desired signal due to ranging is a fraction of the total pulse height. This fraction may be of the order of a tenth of a volt input to the first amplifier.

The coupling between tubes 47 and 48 has a long time constant, so that a large average bias is maintained from pulse to pulse, developed by driving tube 48 to the grid-current point by the large positive pulse applied to its grid. If a difference in alternate pulse heights is present, tube 48 reaches the grid-current point only on the larger amplitude pulse, thus accentuating the differential.

Comparator-Discriminator

In general, the system immediately following the pulse amplifiers 47 and 48 has the function of rectifying and averaging the output of these amplifiers. At this point in the system, however, additional functions occur which must now be described. It should be recalled that for the purpose of stabilizing the operation of the present system against varying or differing voltages and tube characteristics, a comparator scheme is utilized in which the amplitude of "active" detector pulses is compared with that of detector pulses that are "passive," that is, which have not been preceeded by a transmitter pulse. The "active" and "passive" phases occur alternately and are illustrated in FIG. 2E.

Comparison of alternate pulse heights is performed by a discriminator circuit which sorts out the active and passive cycles and rectifies the pulses in a pair of diodes 53 and 54. Subtraction of the rectified pulse heights of alternate cycles from those of intervening cycles provides a D.-C. output which activates the control loop.

At this point, it is necessary to discuss auxiliary circuitry which provides switching of the discriminator diodes 53 and 54 and causes the R.-F. oscillator 37 to produce transmitting pulses only on alternate cycles.

Half-Frequency Signal

A bi-stable multivibrmator 55, triggered from the blocking oscillator tube 21, is used to generate a switching signal at one-half the frequency of the blocking oscillator. Triggering is introduced from the grid winding of the blocking oscillator transformer 56 through a pair of diodes in tube 57. Voltage from the multivibrator 55 is applied to the grid circuit of the transmitter pulse thyratron tube 27, preventing operation of he thyratron on alternate cycles.

The multivibrator 55 is also used as the switching voltages for the discriminator diodes 53 and 54. However, appreciable power must be supplied to the discriminator, and such loading applied directly to the multivibrator 55 would overload its operation. The discriminator is therefore driven by a triode amplifier tube 58. A low-pass filter and attenuator 59 in the grid circuit of tube 58 provides proper phase and amplitude of the switching signal.

Two discriminator transformer voltages provide the sorting function of alternate receiver pulses. Diode 53 has negative cathode voltage with respect to the transformer 61 center tap at the time of an echo pulse immediately following a transmitting pulse. Simultaneously, diode 54 has a positive voltage on its cathode with respect to the transformer center tap. Thus, current from the amplifier pulse flows only in diode 53. During the comparator cycle, where no transmitting pulse has occurred, diodes 53 and 54 have opposite polarity from the case above, since the discriminator transformer 61 is driven by the half-frequency signal. If the receiver pulse is of equal amplitude during alternate (comparator) cycles, the discriminator subtracts equal voltages, producing zero output. If the comparator pulse is of less amplitude than the active receiver pulse, a negative D.-C. output is developed because of relatively heavier conduction through diode 53 than through diode 54.

At this stage in the system, a a D.-C. voltage has been produced whose value will go to zero for conditions of no range-target coincidence, that is, "not ranging," and will assume negative values for "ranging" whose amplitude will be determined by the strength of the echo return. Further, this voltage has been stabilized against systemic changes of the absolute detector pulse amplitude.

The voltage thus produced is applied to a phantastron tube 62.

Phantastron

The phantastron 62 is a double-purpose circuit which, in the absence of echo signal, generates a range-search sweep. When an echo signal appears, it acts as a D.-C. amplifier and drops its sweep action.

The output voltage from the phantastron plate is used as the D.-C. grid level control of thyratron 26, thus controlling its ionization time and the system's operating range. In this circuit, the phantastron output has been supplied to the grid of thyratron 26 through a cathode follower circuit 63. The cathode follower is used to isolate the triangle from the phantastron, and to provide a convenient point for metering.

Since the thyratron modulator tube 26 requires a variable negative grid voltage to control the range, the phantastron 62 is operated from a negative power supply, with its plate and screen connected, through suitable resistances, to ground potential. When the output of the discriminator is near zero, indicating that no echo signal is present, the phantastron 62 operates in its familiar sweep-generating fashion. Since a phantastron produces a negatively going sweep with quick return, it may be seen that this wave, operating approximately once per second, in combination with the triangular wave which is also impressed on the grid of thyratron 26, produces a pulse time which searches from minimum to maximum range in one second.

When an echo signal is encountered during a search sweep, the discriminator output becomes negative. When the phantastron grid receives a negative voltage from the discriminator, the sweep action is stopped, and the phantastron 62 automatically becomes a D.-C. amplifier having a voltage gain of about thirty. As long as the discriminator output indicates the presence of an echo signal, the phantastron amplifier pushes the range gate toward minimum range and the system therefore reaches a point of stable equilibrium on the leading edge of the echo.

Proper design of the "servo loop" avoids oscillation about this point of stable equilibrium; two points of phase shift are allowed at frequencies to which the control loop can respond. These points are the integrating condensers across the discriminator output, and the plate-to-grid capacitor 66 across the phantastron tube.

Figure 4:
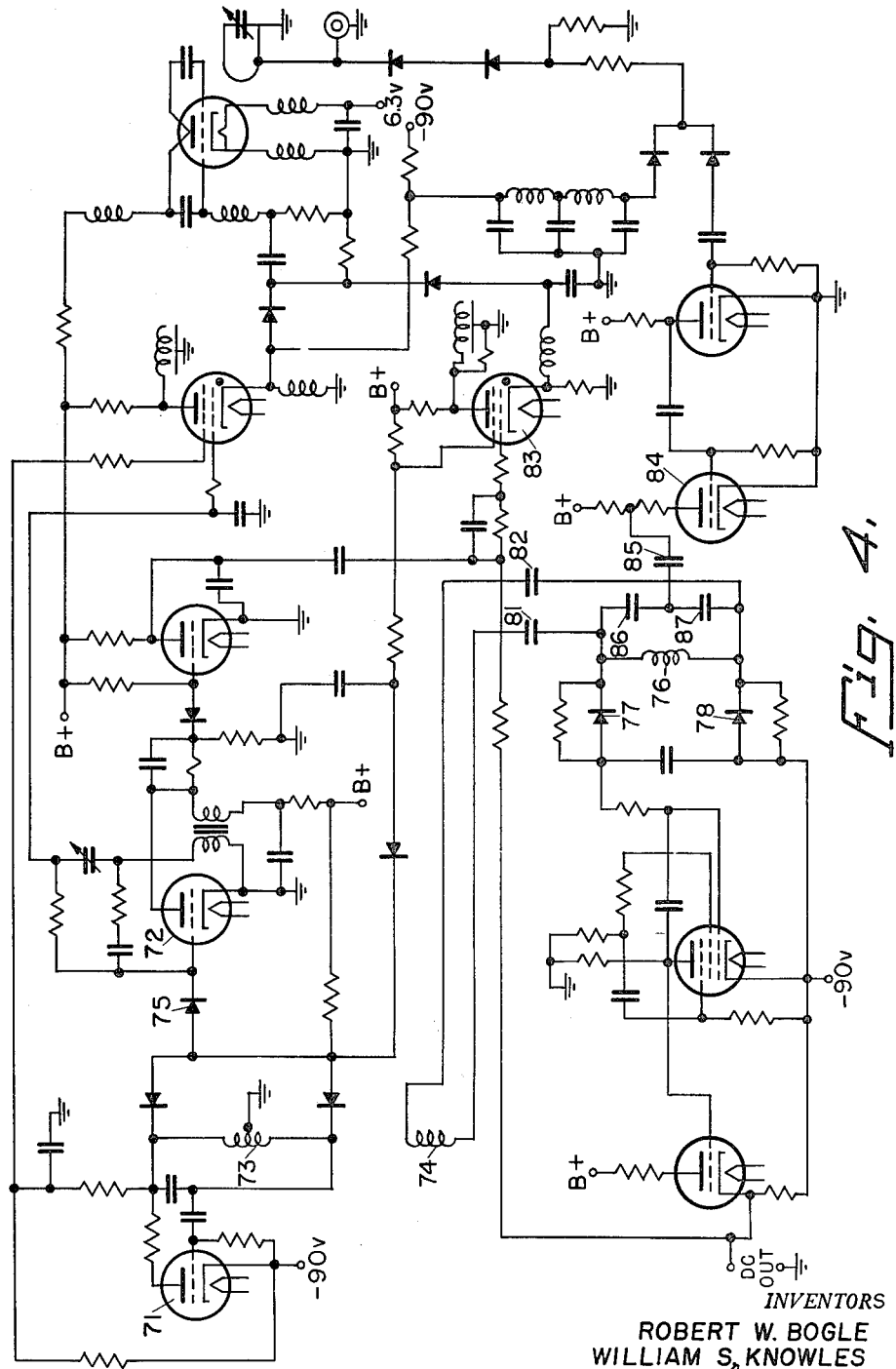
FIG. 4 is a circuit diagram illustrating one preferred modification of circuit details implementing the block diagram of FIG. 1.

One preferred modification of the present invention is illustrated in FIG. 4, wherein the circuit operates substantially in the same manner as described above in relation to FIG. 3, but the comparator switch generator circuitry has been simplified and other minor modifications have been made as follows:

In this system, a Hartley oscillator, including tube 71 and operating at 2.5 kilocycles, is used to trigger a monostable blocking oscillator, including tube 72, at a frequency such as 5.0 kilocycles. The Hartley oscillator tank circuit includes a toroidal coil having two windings 73 and 74, the primary 73 being center-tapped. A toroidal-type tank coil was selected to obtain high Q. By grounding the center tap of the tank coil 73, a push-pull output is obtained which, by full wave rectification, provides the double frequency of five kilocycles to trigger the blocking oscillator tube 72. A third diode 75 is used between the full-wave rectifier and blocking oscillator to prevent the blocking oscillator pulse from loading the Hartley oscillator tube 71.

Since the Hartley oscillator is capable of delivering appreciable power, the discriminator coil 74 is driven from it without need for buffer amplifier. A second toroidal coil 76 is necessary to introduce a 90-degree phase shift between the oscillator tube 71 and the discriminator circuit including diodes 77 and 78. This is required because the blocking oscillator tube 72 is triggered as the Hartley oscillator tank voltage passes through zero, while the voltage across the discriminator coil 76 must be at a maximum at that time and is obtained by "loose" condenser coupling through condensers 81 and 82.

In the discriminator circuit of this modification, driving voltage from tube 84 is passed through a series condenser 85 of less capacity than condensers 86 and 87 which tune coil 76 to resonance.

This precaution is related to the phase characteristics of the servo-loop system mentioned earlier, if the small condenser 85 were omitted, a third point of phase shift within the servo-loop frequency response would be present, causing instability.

A subminiature thyratron 83 was utilized in this modification and its characteristics are such that special circuitry was required in the shield grid lead to aid in proper de-ionization.

Obviously many modifications and variations of the present invention are possible in the light of the above teachings. It is therefore to be understood that within the scope of the appended claims the invention may be practiced otherwise than as specifically described.

What is claimed is:
1. A distance measuring system comprising an oscillator, means for modulating said oscillator to produce spaced transmitter and detector pulses at a predetermined repetition frequency, means for transmitting alternate transmitter pulses as signals, said transmitted pulse signals being operable to be reflected from a remote surface and received by receiving means at said oscillator in coincidence with said detector pulse, means for rectifying and amplifying said oscillator pulse output, means for comparing alternate detector pulses and averaging the difference between said pulses to provide a D.-C. output across D.-C. output terminals, and means including a phantastron circuit connected with said modulating means and said D.-C. output terminals and including means for varying the spacing of said pulses to provide range sweeping in the absence of a ranging signal and means for amplifying the ranging signal when a target is acquired.

2. A distance measuring system comprising an oscillator and transmitting means, means for modulating said oscillator to produce spaced transmitter and detector pulses at a predetermined repetition frequency, alternate pulses being transmitted as signals, said transmitted pulse signals being operable to be reflected from a remote surface and received by receiving means at said oscillator in coincidence with said detector pulse, means for rectifying and amplifying said oscillator pulse output to provide a D.-C. output across D.-C. output terminals, and means including a phantastron circuit connected with said modulating means and said D.-C. output terminals and including means for varying the spacing of said pulses to provide range sweeping in the absence of a ranging signal and means for amplifying the ranging signal when a target is acquired.

3. A distance measuring system comprising an oscillator, means for modulating said oscillator to produce spaced transmitter and detector pulses at a predetermined repetition frequency, means for transmitting alternate transmitter pulses as signals, said transmitted pulse signals being operable to be reflected from a remote surface and received by receiving means at said oscillator in coincidence with said detector pulse, means for rectifying and amplifying said oscillator pulse output, and means for comparing alternate detector pulse and averaging the difference between said pulses to provide a D.-C. output.

4. A distance measuring system comprising an oscillator connected with transmitting and receiving means, a pulse generator coupled with said oscillator, means for controlling said pulse generator whereby said oscillator will be caused to emit pairs of spaced pulses at a predetermined repetition rate, means for varying the spacing of the pulses of each pair as a function of distance, the first pulse only of each pair being reflected to said oscillator from a surface remote from the system at a time coincident with the generation of said second pulse of each said pair for producing superregenerative action by the oscillator, means for detecting and amplifying the oscillator output, means connected with said oscillator for gating the first oscillator pulse, and means for producing from said second oscillator pulse a D.-C. voltage whose amplitude is proportional to the distance from said remote point.

5. A distance measuring system comprising an oscillator connected with transmitting and receiving means, a pulse generator coupled with said oscillator, means for controlling said pulse generator whereby said oscillator will be caused to emit pairs of spaced pulses at a predetermined repetition rate, means for varying the spacing of the pulses of each pair as a function of distance, said first pulse only of each pair being reflected to said oscillator from a surface remote from the system at a time coincident with the generation of said second pulse of each said pair for producing superregenerative action by the oscillator, and means for producing from said second pulse output from said oscilator a D.-C. voltage output whose amplitude is proportional to distance from said remote surface.

References Cited in the file of this patent

UNITED STATES PATENTS

| | | |
|---|---|---|
| 2,476,409 | Free | July 19, 1949 |
| 2,498,495 | Jensen | Feb. 21, 1950 |
| 2,532,221 | Bradley | Nov. 28, 1950 |
| 2,536,801 | Emerson | Jan. 2, 1951 |
| 2,573,762 | Free | Nov. 6, 1951 |